United States Patent [19]

Levites

[11] 3,947,210

[45] Mar. 30, 1976

[54] INJECTION MOLDING APPARATUS HAVING DEGATING AND SPRUE REMOVAL MEANS

[76] Inventor: Solomon Levites, 601 Longboat Club Road, Sarasota, Fla. 33577

[22] Filed: June 18, 1973

[21] Appl. No.: 370,628

[52] U.S. Cl. .......... 425/441; 425/249; 425/DIG. 51; 249/162
[51] Int. Cl.² ............................................. B29F 1/00
[58] Field of Search............ 425/DIG. 51, 441, 249; 249/66, 162

[56] References Cited
UNITED STATES PATENTS

| | | | |
|---|---|---|---|
| 2,587,070 | 2/1952 | Spillman | 249/66 X |
| 2,969,569 | 1/1961 | Brown | 249/162 X |
| 3,049,759 | 8/1962 | Eberhardt | 425/249 X |
| 3,213,490 | 10/1965 | Johnson | 425/444 |
| 3,443,001 | 5/1969 | Adair et al. | 425/249 X |
| 3,473,197 | 10/1969 | Wilds et al. | 425/438 |
| 3,508,299 | 4/1970 | Ahern | 425/247 |
| 3,509,603 | 5/1970 | Halsall et al. | 425/249 |
| 3,585,690 | 7/1969 | Tucker | 425/139 |
| 3,838,960 | 10/1974 | Lovejoy | 249/162 |

Primary Examiner—R. J. Shore
Assistant Examiner—Carl Rowold

[57] ABSTRACT

Apparatus for injection molding parts which comprises forming mold cavities from a set of molds and injecting molding material into the cavities to mold a part on a pin extending up in each cavity; the molded parts are then ejected by being pushed up and off the pins when the molds are moved to expose the parts; ejection involves the application of a substantially uniform force over the base of the moulded part. The apparatus includes means for automatically degating moulded parts from waste material involving initial movement of one of the molds in the set relative to the others; automatic degating can be employed which can occur internally or externally of the molded parts; the molds employed with these specific ejecting and degating means, or with other ejecting and degating means, comprise an upper and lower portion of a universal mold base which forms an integral part of the molding apparatus and to these portions are detachably secured modular mold sections.

6 Claims, 19 Drawing Figures

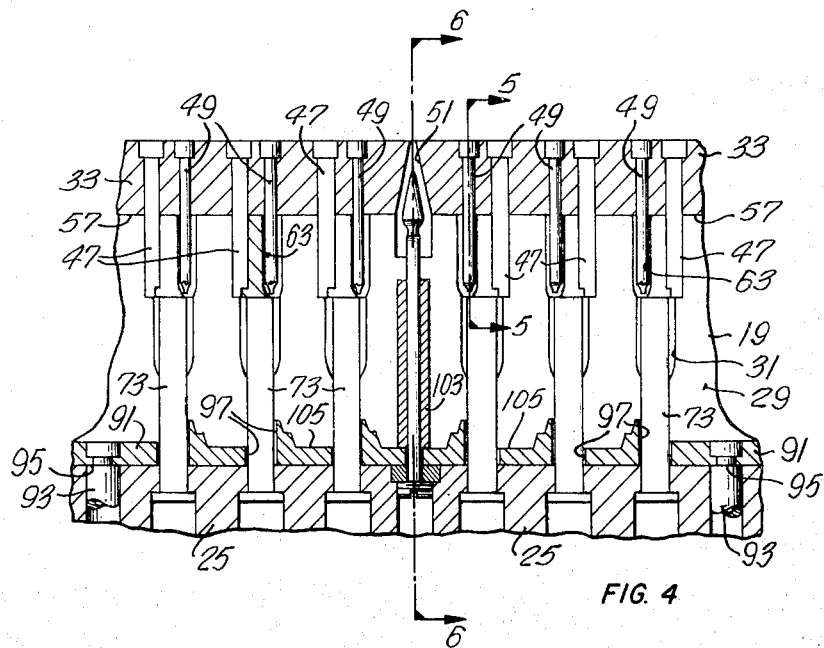
FIG. 4
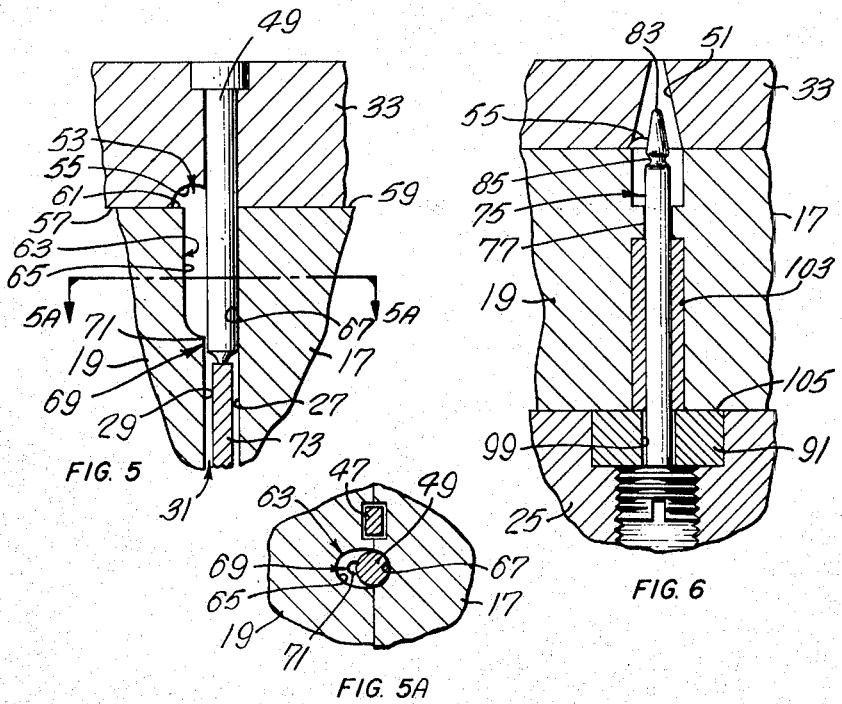
FIG. 5
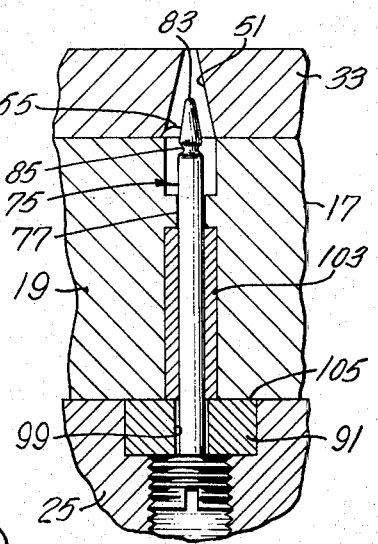
FIG. 6
FIG. 5A

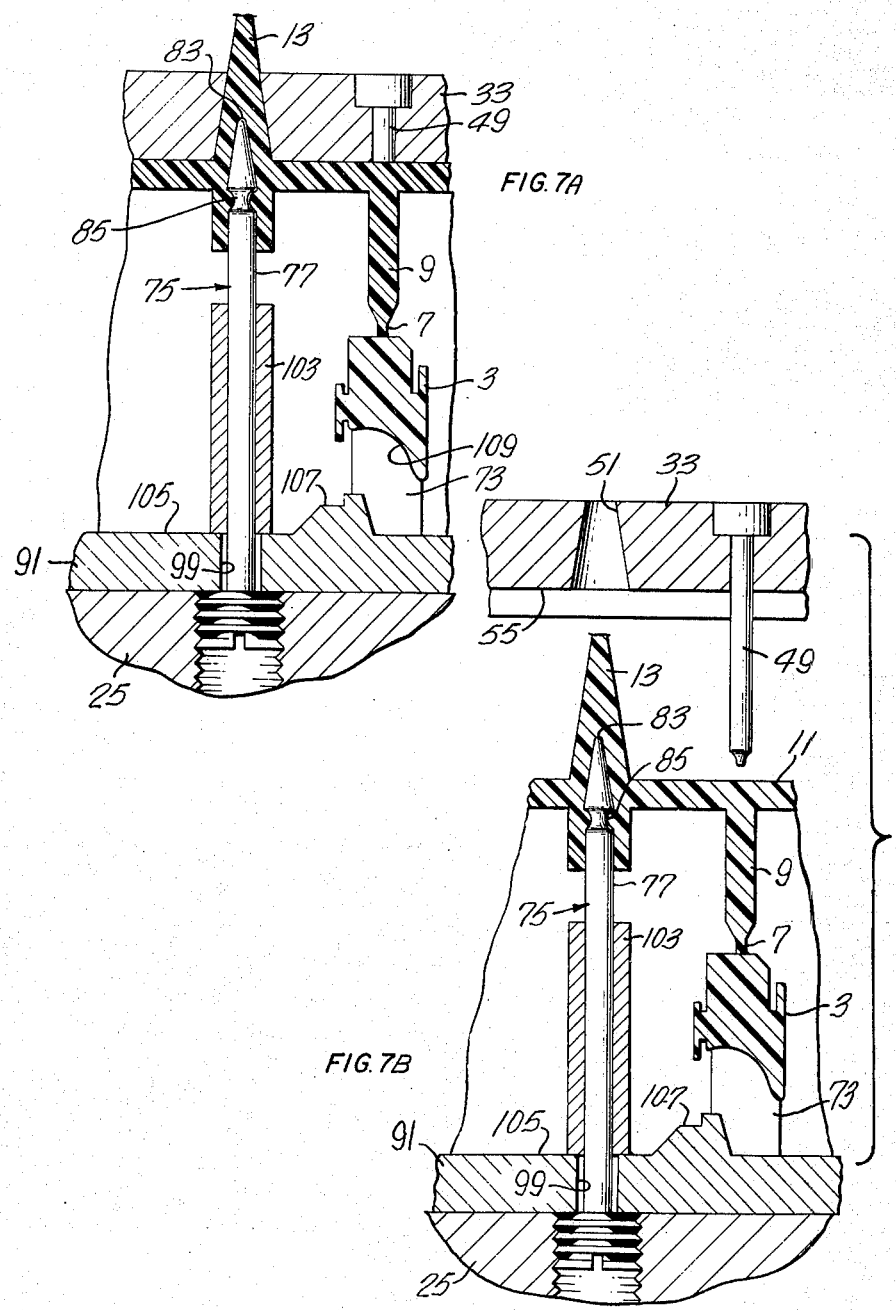

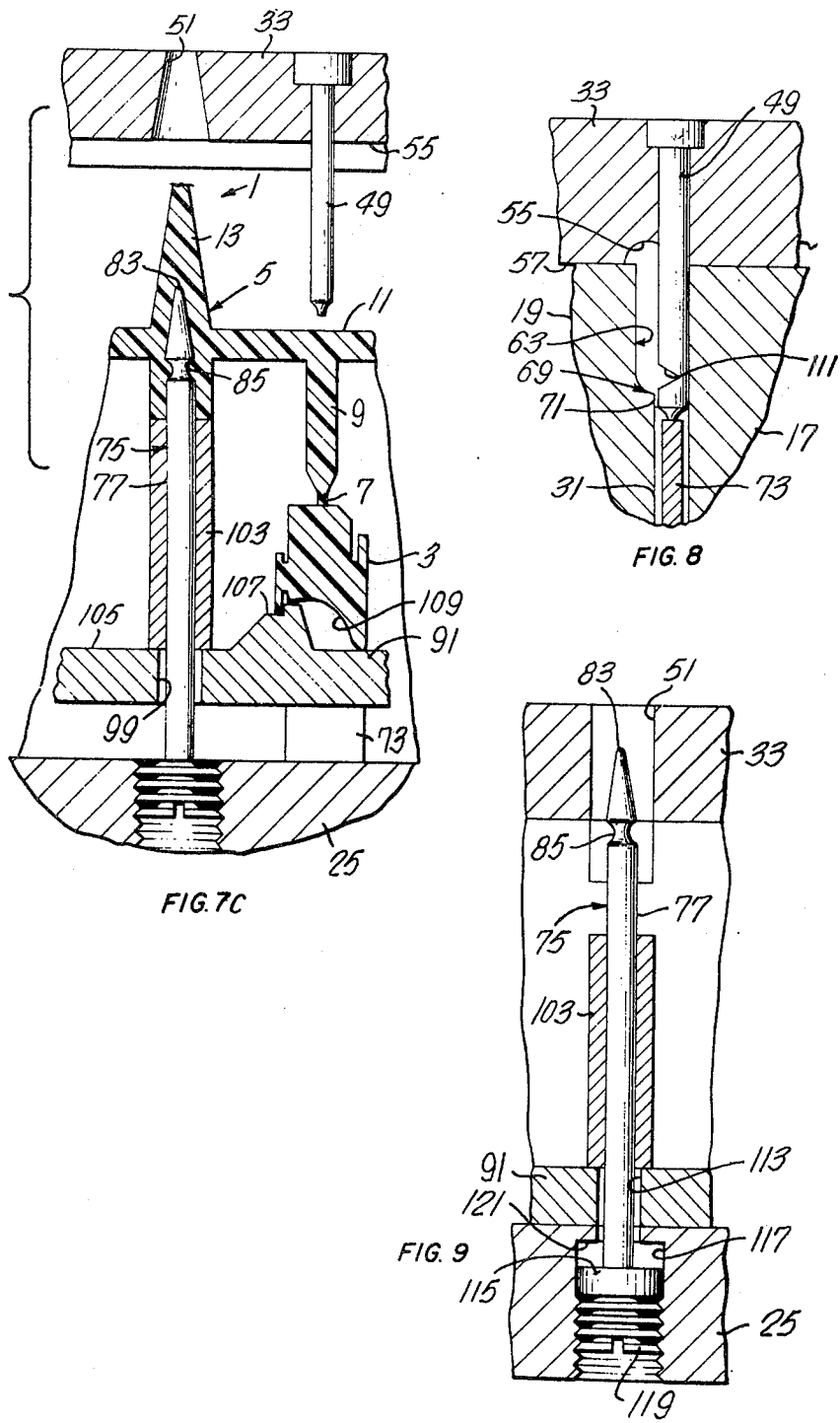

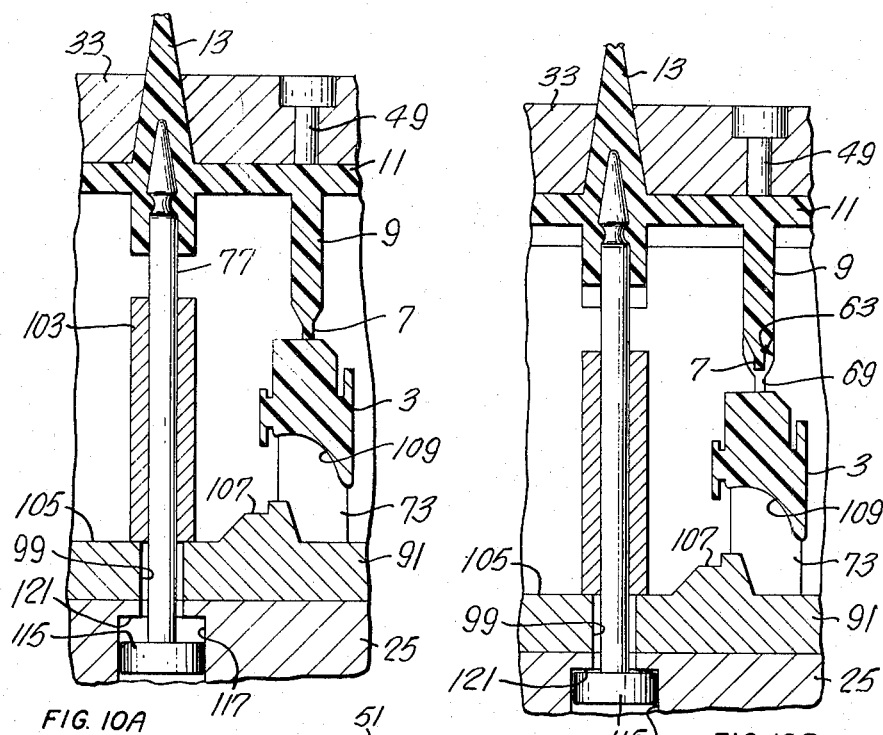
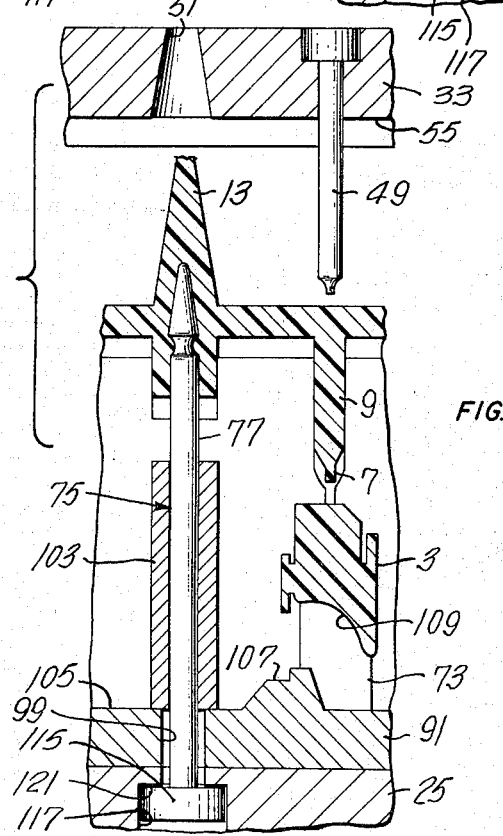
FIG. 10A  FIG. 10B  FIG. 10C

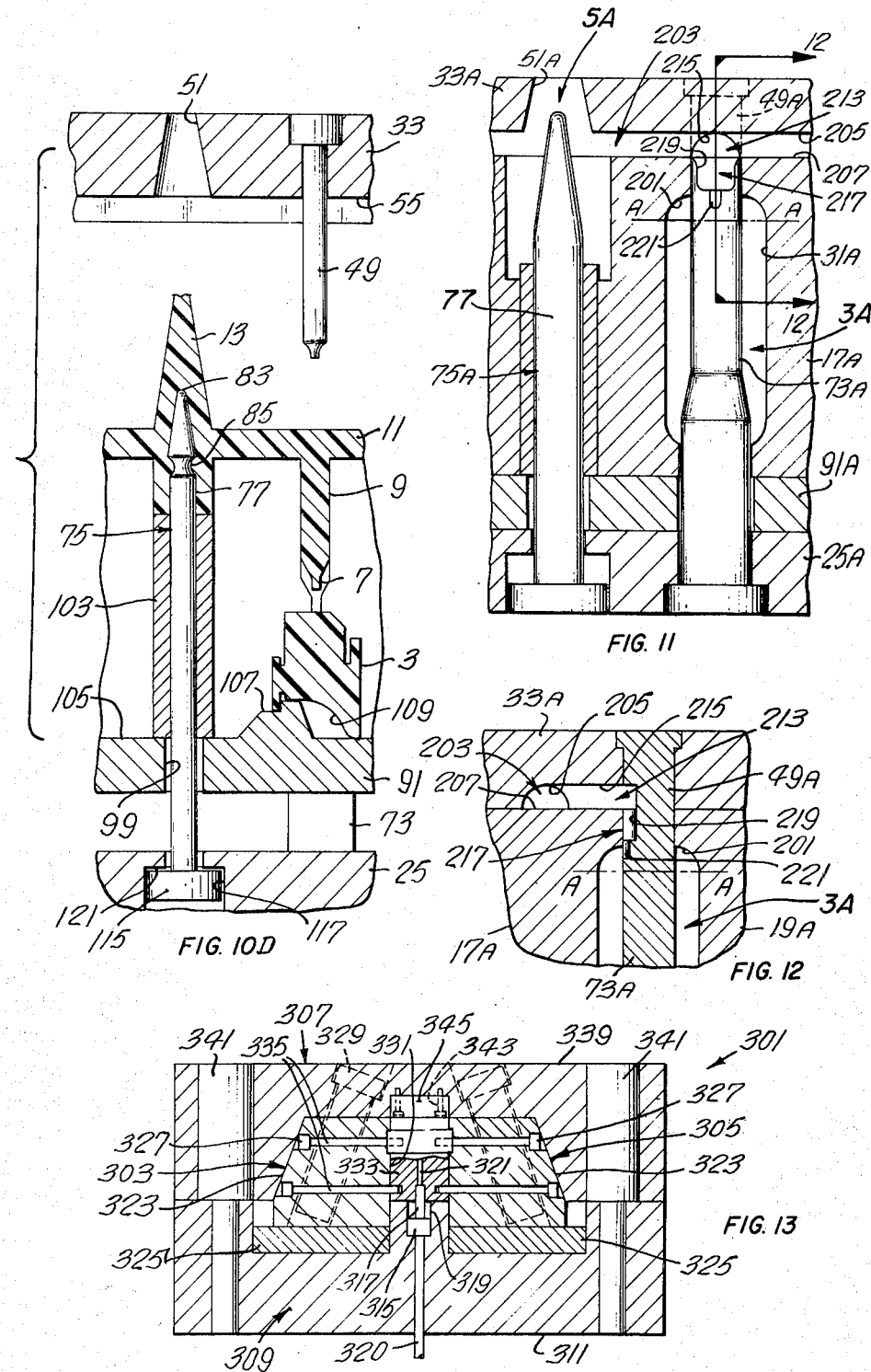

INJECTION MOLDING APPARATUS HAVING DEGATING AND SPRUE REMOVAL MEANS

BACKGROUND OF THE INVENTION a. Field of the Invention

This invention relates to improvements in injection molding.

b. Description of Prior Art

Injection molding apparatus presently used has several disadvantages. The ejection of the molded parts from the apparatus can be difficult or awkward when the parting line between the molds defining the mold cavities in which the parts are molded, is horizontal. Usually individual knock-out pins are required, one or more for each molded part, to remove it from the molding apparatus, and this can make the apparatus expensive.

Ejection of the molded parts can also be difficult if the parts to be molded have an uneven base. The knock-out pin or pins may not apply uniform force on the part when stripping it from a core if it acts or they act against an uneven base and damage to the part can occur.

A further disadvantage in injection molding is that the waste or sprue member, which comprises molding material that has set in the channels and passages leading to the mold cavities after molding must be manually separated from the parts molded in the cavities. This is time consuming and expensive. Also, the separation operation may leave a rough surface area on the finished part which may necessitate a further operation to clean or smooth the rough surface area.

A further disadvantage is the face that known injection molding apparatus employs integral molds which have both the mold defining surface and the positioning and moving means on the same member; because of this use of integral molds, it is very difficult and time consuming to change an injection molding machine to mold different parts. Also, the molds required for different parts are expensive since each mold must include both and the mold defining surface and the positioning and moving means.

SUMMARY OF INVENTION

It is the purpose of the present invention to provide improvements in injection molding which overcome or at least minimize the above noted disadvantages.

The present invention provides a novel means for ejecting or stripping molded parts from the molds.

The present invention also provides improvements in the removal of molded parts particularly those having uneven bases from the cores of molding machines. The improvement provides means for the application of a substantially uniform force over the entire base of the part to strip the part from a pin.

The present invention further provides apparatus for automatically degating molded parts, either internally or externally of the parts, when removing them from the mold, the degating apparatus can be used in conjunction with the novel ejecting apparatus.

The invention further provides a molding apparatus which employs molds each made in at least two pieces, with one piece containing the mold-defining surface and the other piece being used to detachably mount the one piece in the apparatus in the proper position. The two piece molds can be employed in molding apparatus which incorporates the novel ejecting means and which incorporates the novel degating means, if desired.

More particularly, the present invention is directed toward molding parts which comprises means forming cavities in a set of molds and means for injecting molding meaterial into the cavities to form a part of each cavity on a pin which extends upwardly in the cavity; the molded parts on the pins are then exposed, and the exposed parts are moved up and off the pins.

The invention is also directed toward the apparatus which comprises a set of molds, at least some of which are movable to form mold cavities in which parts are to be molded; a pin member extends up in each cavity and means direct molding material into each cavity to mold the product which is defined by the open area between the pin member and the mold cavities and means are also provided for pushing the molded part up and off each pin member after the molds are moved to expose the parts on the pin members.

The invention is further directed toward means for molding articles which comprises movable molds together brought to form at least one cavity in which a part is to be molded, in which molding material passes from a sprue in one of the molds, through passages, to the cavity and after the molding material has set, the one mold element is moved an initial distance away from other element to degate or separate waste molding material in the passages and sprue from the part and both the part and the waste material are then removed from the apparatus.

The invention is directed toward an apparatus for use in carrying out a degating method in which the apparatus comprises two movable side molds, and means for moving the molds together to define therebetween open-ended cavities in which parts are to be molded. Two end elements, at least one of which is movable, cooperate with the side elements to substantially close the ends of the cavities. Passage means direct molding material from a sprue in one movable end element to one end of each cavity, pin means on the other end element extend into the cavities. A sprue molding member on the other end element extends into the sprue on the one end element.

The invention is further directed toward molding apparatus having two, movable side elements and means for moving the side elements together to define open-ended cavities in which parts are to be molded. End elements, at least one of which is movable, cooperate with the side molds, to close the cavities. Passage means are provided for directing molding material to one end of each cavity. Means are provided in one of the end elements for separating the molded parts from waste molding material in the passage means when the one end element is moved relative to the side elements after molding.

The invention is still further directed toward molding apparatus which has two, movable side molds, means for moving the side molds together to define cavities in which parts are to be molded and end element, at least one of which is movable, cooperating with the side elements to close the cavities, each element comprises a main base or support member and a die plate detachably connected thereto.

The invention is also directed toward the set of detachable die plates.

BRIEF DESCRIPTION OF DRAWINGS

The invention will now be described in detail having reference to the accompanying drawings in which:

FIG. 4 is a fragmentary cross-section of the apparatus taken along line 4—4 of FIG. 2 generally on the mold parting line;

FIG. 5 is an enlarged fragmentary cross-section of the apparatus taken along line 5—5 of FIG. 4;

FIG. 5A is a cross-section taken along line 5A—5A of FIG. 5;

FIG. 6 is an enlarged fragmentary cross-section of the apparatus taken along line 6—6 of FIG. 4;

FIGS. 7A, 7B and 7C are detail views of the apparatus showing different stages of removing the molded parts;

FIG. 8 is a detail of a modification in the part of the apparatus similar to that shown in FIG. 5;

FIG. 9 is a detail of a modification in the part of the apparatus similar to that shown in FIG. 6;

FIGS. 10A, 10B, 10C and 10D are detail views of the modified apparatus of FIG. 9 taken during different stages in removing the molding parts;

FIG. 11 is a cross-section view of another mold embodiment;

FIG. 12 is a fragmentary cross-section view taken along line 12—12 of FIG. 11; and FIG. 13 is a front elevation view of a further embodiment of the mold apparatus.

DESCRIPTION OF PREFERRED EMBODIMENTS

Figure 1:
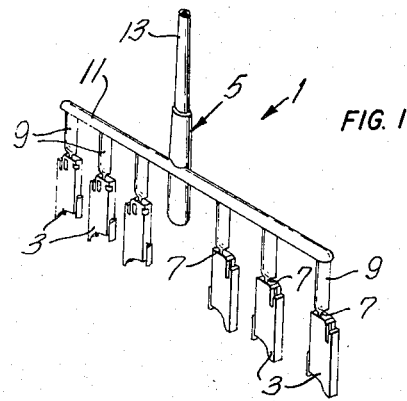
FIG. 1 is a perspective view of a molded article prior to separation of a sprue member from molded parts.

The invention is directed toward the injection molding articles 1 of the type shown in FIG. 1. The article 1 comprises a plurality of identical molded parts 3 connected to a waste or sprue member 5 by narrow necks or gates 7. Sprue member 5 comprises runner members 9 leading from gates 7 to a main channel member 11 which connects with a sprue 13.

Figure 2:
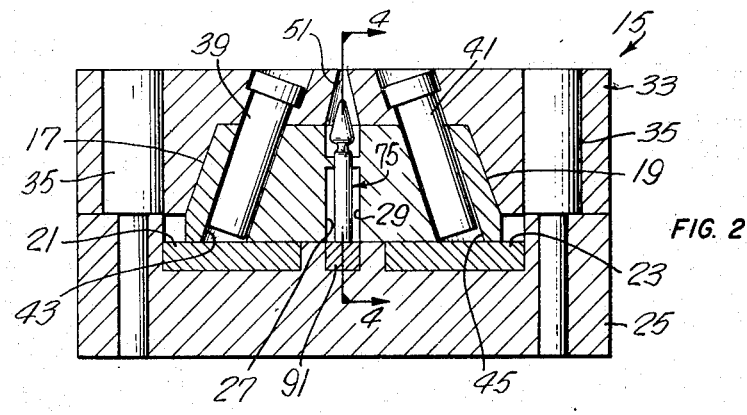
FIG. 2 is a cross-sectional elevational view of the molding apparatus in a closed position.
Figure 3:
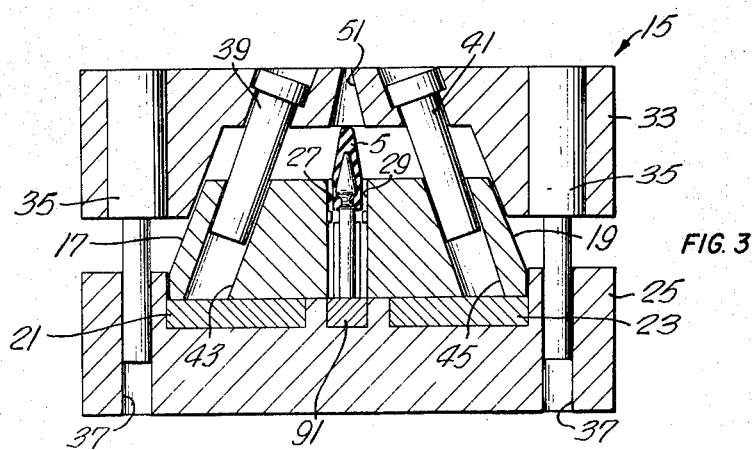
FIG. 3 is a cross-sectional view of the molding apparatus in FIG. 2 in an open position; after an article has been molded.

An injection molding apparatus 15 is provided for molding article 1. The apparatus 15, as shown in FIGS. 2 and 3, includes a pair of movable side molds 17, 19. The side molds 17, 19 are mounted on stationary wear plates 21, 23 respectively which are in turn, fixed by suitable means, to end or bottom element 25 which acts as a platform. The side molds are located in the side-by-side relation and their facing surfaces form die cavity surfaces 27, 29 which, when the molds 17, 19 are closed to have surfaces 27, 29 in proximate relation, provide open-ended cavities 31 in which parts 3 are molded (as shown more clearly in FIG. 5).

A second end or top mold element 33 is also provided for cooperating with side elements 17, 19 to close the top end of cavities 31. The top element 33 has a pair of fixed vertical pins 35 which slide into holes 37 in bottom element 25 to properly locate and guide top element 33 relative to bottom mold 25. Top element 33 also carries a pair of fixed, inclined pins 39, 41. Pins 39, 41 diverge from one another and slide freely in inclined holes 43, 45 in elements 17, 19 respectively. Top mold elements 33 also includes members 47 and top pins 49 (shown in FIG. 4) which extend down to cavities 31 to substantially close their open top ends. A central sprue opening 51 is provided in top mold element 33 for receiving the molding material from an external source (not shown). The opening 51 connects with a main channel 53 formed by groove 55 in the bottom surface 57 of mold element 33 and the top surfaces 59, 61 of the abutting side mold elements 17, 19 as shown in FIGS. 5 and 5A. Runners 63 lead down from main channel 53 to each cavity 31. Each runner 63 is formed by grooves 65, 67 in side mold elements 17, 19 respectively and a portion of top pin 49. Runner 63 in each case terminates in a gate 69 formed by a small groove 71 leading off from large groove 65. Gate 69 leads into cavity 31.

Bottom mold element 25 carries bottom pins 73, one for each cavity 31, which extend up into the cavity thus closing the open bottom ends as shown in FIG. 4. The top of the bottom pins 73 abut the bottom of pins 49 and members 47 at the top of the cavity adjacent gate 69. The parts 3 are molded on bottom pins 73. Bottom mold element 25 also carries sprue member puller means 75. This puller means comprise a rod 77, as shown in FIG. 6, extending up from mold bottom 25, through a bore in side mold elements 17, 19 and into opening 51 in top mold element 33. The top end 83 of rod 77 has an undercut 85 for receiving waste material.

The bottom mold element 25 includes means for ejecting or stripping the parts 3 and sprue member 5 from the mold elements after molding, the stripping means preferably comprises a stripper plate 91 mounted on a pair of guide pins 93 on bottom mold element 25. As shown in FIG. 4, the plate has a pair of holes 95 at its ends for receiving guide and pusher pins 93.

The stripper plate 91 also has holes 97, through which bottom pins 73 freely pass, and a central hole 99, through which puller rod 77 freely passes. Pusher pins 93, passing freely through bottom mold element 25, connect plate 91 to suitable actuating means (not shown). Plate 91 also has a sleeve 103 projecting from its top surface 105 and concentric with hole 99 to surround puller rod 77. Mold elements 17, 19, 25 and 33 are all suitably mounted in frame means (not shown) of a molding machine along with the suitable actuating means.

OPERATION

In operation, the elements 17, 19 and 33 are moved to the position of FIG. 2, to form empty cavities 31 as shown in FIGS. 4 and 5. More particularly, top mold element 33 is moved down toward mold 25 bottom by suitable known actuating means (not shown). This downward movement of mold element 33 causes elements 17, 19 to be brought together via angled pins 39, 41 (position of FIG. 3 to position of FIG. 2). When cavities 31 have been formed, suitable molding material is injected into the cavities through sprue opening 51, channel 53, runners 63 and gates 69. The material is molded about bottom pins 73 in the cavities 31 to form molded parts 3. After the molding material has set, as shown in FIG. 7A, top mold element 33 is raised by its actuating means away from bottom mold element 25 as shown in FIG. 7B. This upward movement simultaneously causes side elements 17, 19 to move outwardly away from each other via pins 39, 41 causing them to slide out on plates 21, 23; see FIG. 3. This leaves parts 3, on pins 73 exposed as well as attached to sprue member 5. When top mold element 33 is raised, the sprue member 5, consisting of waste molding material in opening 51, channel 53, runners 63 and gates 69, remains in place, held by the undercut 85 on the sprue member puller means 75. Stripper plate 91 is now actuated to move up from bottom mold element 25 as shown in FIG. 7C. As plate 91 moves vertically up, sleeve 103 pushes sprue member 5 off rod 77 while top surface 105 of the plate is simultaneously pushing parts 3 off bottom pins 73. Article 1 consisting of joined parts 3 and sprue member 5, falls away, after clearing rod 77, and pins 73 and the apparatus is ready for the next molding operation. pars 3 can later be manually separated from sprue member 5.

Preferably, the top surface 105 of plate 91 is contoured as shown at 107 to conform to the contoured bottom surfaces 109 of the parts 3 being molded. The side elements 17, 19 are shaped to receive this contoured surface where they abut over it. The contoured top surface 105 permits parts 3 with uneven bottom contours 109 to be pushed off pins 73 with uniformly applied vertical pressure. The parts 3 are not subjected to twisting forces which could damage them during stripping.

While parts 3 can be ejected from the apparatus integrally with member 5, it is preferred to separate or degate the parts 3 from member 5 automatically prior to stripping. To provide automatic degating, each top core pin 49 is provided with a transverse notch 111 extending off runner 63 and adjacent gate 69 as shown in FIG. 8. Also, puller means 75 is mounted in bottom mold 25 to have limited vertical movement rather than being fixed as before. To this end as shown in FIG. 9, rod 77 passes freely through a bore 113 in bottom mold element 25. Rod 77 has an enlarged head 115 which fits in a counterbore 117 in bottom mold element 25. Head 115 has a length shorter than the length of counterbore 117, FIG. 9–10D which is closed with a plug 119. This permits head 115 to freely move in counterbore 117.

AUTOMATIC DEGATING OPERATION

In operation, molding material enters notches 111 during molding of parts 3 and sets as shown in FIG. 10A. As the top mold element 33 starts moving upwardly its engagement with the waste material in the notch will cause the material to break away from parts 3 at gates 69 and as shown in FIG. 10B. The sprue member 5 can be raised a short distance because the puller means 75 about which it is mounted, has limited vertical movement in counterbore. As member 5 breaks away from parts 3, head 115 of rod 77 encounters the base 121 of counterbore 117 and is prevented from rising further. The travel of head 115 of rod 77 in counterbore 117 permits plates 27 and 29 to separate a distance greater than the depth of notch 111 in the pins 49. This makes possible the release of the material that has been molded into this notch 111 and the retention of member 5 on rod 77. The undercut 85 holds onto sprue member 5 as it is separated from the top mold element 33 and pins 49, as shown in FIG. 10C. Member 5 is then stripped off rod 77 as before through upward movement of plate 91; see FIG. 10D, and now falls away separate from stripped off parts 3.

The automatic degating operation described has separated sprue member 5 from parts 3 at an external location on parts 3. The separation occurs at gates 69. While external degating cannot always be avoided, depending on the part to be made, it does tend to leave a rough surface on the part which may require smoothing. Therefrom, in another embodiment of the invention, the molds are modified to provide automatic degating of the parts internally thereof. In this embodiment, the top core pins are extended into the parts being molded. As shown in FIGS. 11 and 12, four mold elements 17A, 19A, 25A and 33A are employed in a similar manner as elements 17, 19, 25 and 33, to form mold cavities 31A. When the molds are in the molding position, core pins 49A extend down from top mold element 33A into cavities 31A. The core pins 49A abut with bottom core pins 73A extending up from bottom mold 25A at a plane A—A slightly below the top end 201 of cavity 31A; see FIG. 11. A channel 203 is formed by groove 205 in top mold element 33A cooperating with top surface 207, of side mold element 17A. Channel 203 directs molding material from a sprue opening 51A in top mold element 33A to horizontal runners 213 formed by grooves 215 in top mold element 33A and top surface 207 of side mold element 17A. Horizontal runners 213 communicate with vertical runners 217 extending down to a point just above cavities 31A. Runners 217 are each formed by a groove 219 in core pin 49A and side wall of a bore defined by side elements 17A, 19A for receiving pin 49A. A narrow blind groove 221 extends from the end of groove 219 in pin 49A to a point just within cavity 31A. The molding material flows through groove 221 into the cavity 31A to mold the material. The groove 221 acts as a gate. Upon completion of the molding, after the material has set, top mold element 33A is initially raised a short distance to separate sprue member 5A from parts 3A. Separation occurs due to pin 49A shearing off the material in groove 221 from the material of part 3A. It is noted that the shearing, and thus separation occurs internally of part 3A, and this is a clean separation.

After internal degating, top mold element 33A continues to move away with sprue member 5A being pulled away therefrom by sprue member puller means 75A as before. The travel of head 115 of rod 77 in counterbore 117 permits plates 27 and 29 to separate a distance greater than the depth of notch 219 in the pins 49. This makes possible the release of the material that has been molded into this notch 219 and the retention of member 5A on rod 77. The sprue member 5A and parts 3A are then stripped off the rod 77A and bottom core pins 73A as before by stripper means such as a stripper plate 91A. Stripper plate 91A can include a contoured top surface, as before, to strip off parts 3A having contoured bottom surfaces.

In all the embodiments described thus far, the molds used incorporate the die surfaces and pins integrally with the means on the molds to locate and to be used in moving the molds. The present invention contemplates employing molds, each made in at least two pieces, with one piece forming a base member having the locating and moving means thereon and the other piece having a die surface. The piece with the die surface can be detachably connected to its base member. The base members of the molds remain attached to the frame of the molding apparatus. The pieces or plates carrying the die surfaces however can be readily replaced by a different set of die plates for molding a different part. The molding apparatus incorporating the die plates, can be used with, or without, the ejecting means and degating means previously described.

As shown in FIG. 13, the apparatus 301 incorporating separate die plates comprises side mold elements 303, 305, top mold element 307 and bottom mold element 309. Bottom mold element 309 comprises a base or platform member 311 fixed to the frame (not shown) of the molding machine. Detachably connected to base member 311 by suitable means, such as bolts (not shown) is bottom die plate 315 having pins 317 extending up therefrom. A stripper plate 319 forms part of die plate 315 and can be moved by suitable means such as push rods 320 relative to pins 317 to strip the parts being molded off the pins. Die plate 315 can also mount puller means 321 for the sprue member.

The side mold elements 303, 305 each comprise a base or cam member 323 mounted for sliding movement on a plate 325 fixed on platform 311. Cam member 323 have an inclined bore 327 for receiving an inclined pin 329 extending down from top mold 307. Mounted on the surface 331 of the cam members 323 which face each other is a die plate 333. Die plate 333 is detachably connected to cam member 323 by bolts 335. Die plate 333 has a die surface which, when the two plates 333 are abutting, form mold cavities for molding parts.

Top mold element 307 comprises a top member 339 connected to suitable actuating means (not shown) in the apparatus and mounted for movement away or toward platform 311 by vertical guide pins 341. Top member 339 also carries inclined pins 329 which, when top member 339 is raised or lowered, moves cam members 323 away or toward one another. Detachably connection to top member 339 by bolts 343 is a top die plate 345 having top pins and means for directing molding material from injection means (not shown) to the cavities formed by the die plates in the molding position. As described, the plates forming the mold cavities can be readily replaced when it is desired to mold a new part without having to replace the die plate positioning and moving means.

I claim:

1. In an injection molding apparatus including two juxtapositionable side molds including cooperating means for forming a sprue and gates communicating with open-ended article-forming cavities;

juxtapositionable bottom and top mold elements, at least one of said top and bottom mold elements being displaceable vertically relative to the other and including means for closing the open-ended article-forming cavities;

means operatively connecting said side molds and bottom and top mold elements for moving them simultaneously and in unison and causing the side molds to be spaced laterally at a vertical parting line therebetween when the top mold element is raised vertically from said bottom mold element, the improvement comprising:

automatic article degating means and sprue-removingmeans including bottom pins on said bottom mold element projecting into the article-forming cavities at the parting line for conforming to a surface of the articles being molded and supporting the molded articles thereon when the side molds are moved apart at the vertical parting line; sorue-removing means sprue-pulling means of said bottom mold element comprising a sprue-holding rod projecting from the bottom mold element at the vertical parting line and including an upper portion projecting into the sprue, said sprue-holding rod including means for receiving on the portion projecting into the sprue molding material therein so that the sprue of the articles and the molded articles are integrally connected by the gate;

top pins and top members depending from said top molded element at the vertical parting line into said article-forming cavities for movement with the top mold element relative to the bottom mold element and side molds upon upward relative movement of said top mold element; and stripper means on said bottom mold element and including means for moving the stripper means relative to the bottom pins and sprue-holding rod when the side molds are apart at the vertical parting line when the sprue and the molded articles are exposed between the side molds; said top pins comprising automatic degating means including means for receiving mold material therein for automatic degating of the molded articles from the sprue prior to the sprue being separated from the sprue-holding rod, said sprue-holding rod being displaceably mounted in said bottom mold element and having limited relative movement with respect to said bottom mold element, said top pins and sprue-holding rod having means affording a timing sequence between article-degating and sprue-removal whereby initial upward movement of said top mold element degates the articles from the sprue retained on the sprue-holding rod, and the stripper means subsequently strips the sprue from the sprue-holding rod after the side molds are spaced at the vertical parting line.

2. The structure as claimed in claim 1, in which said stripper means includes a plate having an upper surface portion with a contour for corresponding to the bottom contour of each exposed molded part for applying a substantially uniform force on each exposed molded part when stripping it off the bottom pins.

3. The structure as claimed in claim 1, wherein said side molds, top and bottom mold elements comprise side, top and bottom base members, and side, top and bottom die plates detachably connected to the respective base members.

4. The structure as claimed in claim 1, in which said stripper means comprises a displaceable stripper plate having portions through which said bottom pins and sprue-holding rod freely project for permitting relative movement between said stripper plate and the bottom pin and the sprue-holding rod.

5. The structure as claimed in claim 4, in which said stripper plate includes a sleeve element circumposed about said sprue-holding rod and displaceable with said plate for dislodging the sprue and material molded about said sprue-holding rod.

6. The structure as claimed in claim 1 in which said top pins extend from the top mold element into said article-forming cavities, said top pins abutting said bottom pins in a plane below an upper portion of the article-forming cavity, said top pins including a gate-forming groove extending to a point within the article-forming cavities whereby upward movement of said top mold element relative to said bottom mold element and the sprue-holding rod causes internal degating of the molded article within the article-forming cavity.

* * * * *